(12) United States Patent  
Li et al.

(10) Patent No.: US 8,797,978 B2
(45) Date of Patent: Aug. 5, 2014

(54) METHOD FOR SENDING AND DETECTING DOWNLINK CONTROL INFORMATION

(75) Inventors: Weijun Li, Guangdong Province (CN); Bo Dai, Guangdong Province (CN); Guanghui Yu, Guangdong Province (CN); Yijian Chen, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 319 days.

(21) Appl. No.: 13/258,592

(22) PCT Filed: Apr. 27, 2010

(86) PCT No.: PCT/CN2010/072262
§ 371 (c)(1),
(2), (4) Date: Sep. 22, 2011

(87) PCT Pub. No.: WO2010/124628
PCT Pub. Date: Nov. 4, 2010

(65) Prior Publication Data
US 2012/0033627 A1 Feb. 9, 2012

(30) Foreign Application Priority Data
Apr. 29, 2009 (CN) .......................... 2009 1 0136229

(51) Int. Cl.
*H04W 4/00* (2009.01)
*H04W 72/04* (2009.01)
*H04L 5/14* (2006.01)
*H04L 5/00* (2006.01)

(52) U.S. Cl.
CPC ........... *H04W 72/042* (2013.01); *H04L 5/0082* (2013.01); *H04L 5/0053* (2013.01); *H04L 5/14* (2013.01); *H04L 5/001* (2013.01); *H04L 5/0007* (2013.01); *H04L 5/0094* (2013.01)
USPC .......................................... 370/329; 370/331

(58) Field of Classification Search
CPC .............................. H04W 28/04; H04W 80/04
USPC .................................................. 370/329, 331
See application file for complete search history.

(56) References Cited

U.S. PATENT DOCUMENTS

| 2005/0094657 A1* | 5/2005 | Sung et al. ..................... 370/431 |
| 2009/0109907 A1* | 4/2009 | Tsai et al. ..................... 370/329 |
| 2009/0325626 A1* | 12/2009 | Palanki et al. ................ 455/522 |
| 2010/0040001 A1* | 2/2010 | Montojo et al. .............. 370/329 |

FOREIGN PATENT DOCUMENTS

| CN | 101001138 A | 7/2007 |
| CN | 101404526 A | 4/2009 |
| CN | 101610564 A | 12/2009 |

OTHER PUBLICATIONS

R1-091707, 3GPP TSG-RAN WG1 meeting #57, Primary and Secondary PDCCH Design for LTE-A, May 4-8, 2009, San Francisco, see pp. 1-12.

(Continued)

*Primary Examiner* — Mark Rinehart
*Assistant Examiner* — Angel Brockman
(74) *Attorney, Agent, or Firm* — Ling Wu; Stephen Yang; Ling and Yang Intellectual Property

(57) ABSTRACT

A method for sending and detecting downlink control information is provided. A base station carries the downlink control information in a physical downlink control channel, and sends said physical downlink control channel through component carriers. Said base station bears first type downlink control information on an anchor component carrier, and bears third type downlink control information on a prime component carrier, wherein said first type downlink control information bears one or more types of uplink scheduling information, downlink scheduling information and uplink power control information of its component carrier, said third type downlink control information bears indication information of the second type downlink control information which bears the uplink scheduling information and/or the downlink scheduling information of one or more component carriers. A terminal detects the first type downlink control information on the anchor component carries and detects the third type downlink control information on the prime component carrier.

13 Claims, 3 Drawing Sheets

(56) References Cited

OTHER PUBLICATIONS

R1-090792, 3GPP TSG RAN1#56, Control Signalling Design for Supporting Carrier Aggregation, Feb. 9-13, 2009, Athens Greece, see the whloe document.

International Search Report for PCT/CN2010/072262 dated Jul. 19, 2010.

* cited by examiner

METHOD FOR SENDING AND DETECTING DOWNLINK CONTROL INFORMATION

TECHNICAL FIELD

The present invention relates to the mobile wireless communication field, and particularly, to a method for sending and detecting downlink control information in a wireless communication system.

BACKGROUND OF THE RELATED ART

FIG. 1 shows the frame structures of the Frequency Division Duplex (FDD) mode and the Time Division Duplex (TDD) mode in the Long Term Evolution (LTE) system. In the frame structure of the FDD mode, one 10 ms-radio frame is composed of 20 slots with each being 0.5 ms and being numbered as 0~19, the slot 2i and slot 2i+1 compose the subframe i with the length of 1 ms. In the frame structure of the TDD mode, one 10 ms radio frame is composed of two half-frames with each being 5 ms, and one half-frame includes 5 subframes with each being 1 ms. The subframe i is defined as 2 slots, slot 2i and slot 2i+1, with each being 0.5 ms. In these two types of frame structures, for the Normal Cyclic Prefix (Normal CP), one slot includes 7 symbols with each being 66.7 us, wherein the CP length of the first symbol is 5.21 us, and the CP lengths of other 6 symbols are 4.69 us; for the Extended CP, one slot includes 6 symbols, and the CP lengths of all the symbols are all 16.67 us.

LTE defines following three downlink physical control channels:

the Physical Control Format Indicator Channel (PCFICH): the control channel format indication. The number information of the Orthogonal Frequency Division Multiplexing (OFDM) symbols for transmitting the Physical Downlink Control Channel (PDCCH) in one subframe is indicated, which is sent in the first OFDM symbol in the subframe, and the current frequency is determined by the system downlink bandwidth and the cell Identification (ID).

The Physical Hybrid Automatic Repeat Request Indicator Channel (PHICH): the ACK/NACK feedback information of the Hybrid Automatic Repeat Request (H-ARQ) of the uplink transmission. The number of the PHICHs and the position of the time and frequency can be determined by the system message in the Physical Broadcast Channel (PBCH) and the cell ID.

The Physical Downlink Control Channel (PDCCH): for bearing the downlink control information (including the uplink and downlink scheduling information, and the uplink power control information). The formats of the Downlink Control Information (DCI) include following types: DCI format 0 for the scheduling of the Physical Uplink Shared Channel (PUSCH); the DCI formats 1, 1A, 1B, 1C and 1D for different modes of code word scheduling of the Physical Downlink Shared Channel (PDSCH); the DCI formats 2 and 2A for different mode of the spatial multiplexing; DCI formats 3 and 3A for different modes of the power control commands of the Physical Uplink Control Channel (PUCCH) and the PUSCH.

The physical resources of the PDCCH transmission take the Control Channel Element (CCE) as the unit, the size of one CCE is 9 REGs, namely 36 Resource Elements, and one PDCCH is likely to occupy 1, 2, 4, or 8 CCEs.

For the four type of the sizes of 1, 2, 4 and 8 CCEs of the PDCCH, the tree Aggregation is adopted, namely the PDCCH with one CCE can start from any CCE position; the PDCCH with two CCEs starts from the even CCE position; the PDCCH with four CCEs starts from the CCE position of the integer times of four; and the PDCCH with eight CCEs starts from the CCE position of the integer times of eight.

The PDCCH has 1, 2, 4 and 8 aggregation levels, and each aggregation level defines one Search space, including the common and UE Specific Search spaces. The number of the CCEs of the whole Search space is determined by the number of OFDM symbols and the number of PHICH groups occupied by the control area indicated by the PCFICH in each downlink subframe. UE carries out the blind detection for all the possible PDCCH code ratios according to the DCI format of the current transmission mode in the Search space.

User Equipment (UE) is semi-statically configured through the higher layer signaling to receive the PDSCH data transmission according to the indication of the PDCCH of the UE specific Search space based on one of the following transmission modes:

1. single-antenna port; port 0
2. transmit diversity
3. open-loop spatial multiplexing
4. closed-loop spatial multiplexing
5. multi-user MIMO
6. closed-loop Rank=1 precoding
7. single-antenna port; port 5 if the UE is configured by the higher layer to carry out the PDCCH decoding using the Cyclic Redundancy Check (CRC) scrambled by the cell Radio Network Temporary Identifier (C-RNTI), the UE should decode the PDCCH and all the related PDSCHs according to the corresponding combinations defined in the table 1-1.

If the UE is configured by the higher layer to carry out the PDCCH decoding using the Cyclic Redundancy Check (CRC) scrambled by the semi-persistently scheduled cell Radio Network Temporary Identifier (C-RNTI), the UE should decode the PDCCH and all the related PDSCHs according to the corresponding combinations defined in the table 1-2.

TABLE 1-1

| | the PDCCH and PDSCH configured with the C-RNTI | | |
|---|---|---|---|
| UE downlink transmission mode | DCI format | Search space | The PDSCH transmission scheme corresponding to the PDCCH |
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |

TABLE 1-1-continued the PDCCH and PDSCH configured with the C-RNTI

| UE downlink transmission mode | DCI format | Search space | The PDSCH transmission scheme corresponding to the PDCCH |
|---|---|---|---|
| Mode 3 | DCI format 1A | Common and UE specific by C-RNTI | Transmit diversity |
|  | DCI format 2A | UE specific by C-RNTI | Open-loop spatial multiplexing or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
|  | DCI format 1A | Common and UE specific by C-RNTI | Transmit diversity |
|  | DCI format 1B | UE specific by C-RNTI | Closed-loop Rank = 1 precoding |
|  | DCI format 1A | Common and UE specific by C-RNTI | If the number of the antenna ports of the PBCH is 1, use Single-antenna port, port 0, or else Transmit diversity |
|  | DCI format 1 | UE specific by C-RNTI | Single-antenna port; port 5 |

TABLE 1-2 the PDCCH and PDSCH configured with the SPS C-RNTI

| UE downlink transmission mode | DCI format | Search space | The PDSCH transmission scheme corresponding to the PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | C-RNTI defined UE specific | Transmit diversity |
| Mode 4 | DCI format 1A | Common and UE specific by C-RNTI | Transmit diversity |
|  | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI |  |
|  | DCI format 1 | UE specific by C-RNTI |  |

The UE should detect one group of candidate PDCCHs in each non-Discontinuous Reception (non-DRX) subframe so as to obtain the control information, and the detection refers to decoding the PDCCHs in the group according to all the DCI formats to be detected. The UE should detect the common search spaces with the aggregation level being 4 and 8 respectively and the UE-specific search spaces with the aggregation level being 1, 2, 4 and 8 respectively. The common and the UE-specific search spaces are possibly overlapped. The search space defined by the aggregation level is as shown in the table 1-3. The DCI format which should be detected by the UE depends on the above configured transmission modes.

LTE Release-8 defines 6 types of bandwidths: 1.4 MHz, 3 MHz, 5 MHz, 10 MHz, 15 MHz and 20 MHz;

TABLE 1-3 candidate PDCCHs to be detected by the UE

| | Search space $S_k^{(L)}$ | | |
|---|---|---|---|
| Type | aggregation level L | Size [in CCEs] | Number of PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

LTE-Advanced (Further Advancements for E-UTRA) is the advanced version of the LTE Release-8. Besides satisfying or exceeding all the related demands of 3GPP TR 25.913: "Requirements for Evolved UTRA (E-UTRA) and Evolved UTRAN (E-UTRAN)", the LTE-Advanced should also satisfy or exceed the demands of the IMT-Advanced proposed by the ITU-R, wherein the backwards compatibility demand with the LTE Release-8 refer to: the terminal of the LTE Release-8 can work in the network of the LTE-Advanced; the terminal of the LTE-Advanced can work in the network of the LTE Release-8. Besides, the LTE-Advanced should be able to work under different sizes of the spectrum allocation, including working under the spectrum allocation broader than that of the LTE Release-8 (for example the 100 MHz continuous spectrum resources) so as to achieve the higher performance and destination peak speed. Considering the compatibility with the LTE Release-8, the way of carrier aggregation is adopted for the bandwidth more than the 20 MHZ, namely:

two or more component carriers are aggregated so as to support the downlink transmission bandwidth more than the 20 MHz.

The terminal is able to receive one or more component carriers at the same time with its capability.

The LTE-A terminal with receiving capability exceeding 20 MHz is able to receive the transmission on a plurality of component carriers at the same time. The terminal of LTE Release-8 is only able to receive the transmission on one component carrier if the structure of this component carrier complies with the LTE Release-8 specification.

At present, the LTE-Advanced standard does not have the corresponding description about the sending of the downlink control signaling namely the format of the PDCCH.

SUMMARY OF THE INVENTION

At present, the PDCCH scheme of the LTE-A is composed of different encoding and transmission schemes, mainly including:

1. separate encoding and separate transmission, wherein, the PDCCH is transmitted on the separate component carriers, and the uplink and downlink scheduling information of each component carrier is encoded separately and is on the same carrier with the scheduled PDSCH. The main drawbacks are more signaling overhead and greater number of times of the blind detections.

2. Joint encoding and separate transmission, wherein, the PDCCH is transmitted on the specific component carriers, and the uplink and downlink scheduling information of a plurality of component carriers is encoded jointly. The main drawbacks are that the blocking probability of the PDCCH is higher, and when the practically scheduled component carriers are less than the semi-statically allocated component carriers, the resource waste will be caused, and even the overhead is more than the overhead of the separate encoding.

3. Joint encoding and joint transmission, wherein, one PDCCH is transmitted on a plurality of component carriers, and the uplink and downlink scheduling information of a plurality of component carriers is encoded jointly. The main drawbacks are that the backwards compatibility is worse, and when the practically scheduled component carriers are less than the semi-statically allocated component carriers, the resource waste will be caused, and even the overhead is more than the overhead of the separate encoding.

4. The primary and secondary PDCCHs, wherein the information borne in the primary PDCCH of the fixed format dynamically or semi-statically notifies the DCI format of the secondary PDCCH, thereby solving the problem of the resource waste of the joint encoding of the fixed format. The main drawback is the problem of the decoding chain (namely the performance of the primary PDCCH severely restricts the whole PDCCH performance).

It can be seen that the above scheme also has drawbacks with aspects of the signaling overhead, the number of times of the blind detections, compatibility and bit error performance, which should be further researched.

The technical problem to be solved in the present invention is to provide a method for sending and detecting downlink control information, and this method has better scheduling flexibility, compatibility and bit error performance, lower number of the blind detection times and the blind detection times is not increased with the increase of the number of the scheduled component carriers, and it has less signaling overhead.

In order to solve the above problem, the present invention provides a method for sending downlink control information, a base station carries the downlink control information in a physical downlink control channel, and sends said physical downlink control channel through component carriers, said base station bears first type downlink control information on an anchor component carrier, and bears third type downlink control information on a prime component carrier; wherein said first type downlink control information bears one or more types of uplink scheduling information, downlink scheduling information and uplink power control information of the component carrier of said first type downlink control information, said third type downlink control information bears indication information of the second type downlink control information, and said second type downlink control information bears the uplink scheduling information and/or the downlink scheduling information of one or more component carriers.

The number of said component carriers is n, and when said base station transmits data to a terminal on n component carriers, one component carrier is the anchor component carrier, and one or two component carriers are prime component carriers, $1 < n \leq 5$.

Said anchor component carrier and prime component carrier are semi-statically configured by higher layer signaling, and said anchor component carrier and prime component carrier are UE-specific anchor component carrier and prime component carrier.

The indication information of the second type downlink control information borne in said third type downlink control information includes one or more types of following information: indication information of downlink control information format included in the second type downlink control information, indication information of the component carrier of the second type downlink control information, indication information of an aggregation level of a control channel element and a start position of a control channel element of the physical downlink control channel bearing the second type downlink control information, and uplink scheduling indication information or downlink scheduling indication information.

Said third type downlink control information includes: 1 bit for uplink scheduling indication information or downlink scheduling indication information, 2*n bits for indication information of the downlink control information format of each component carrier, $\lceil \log_2 n \rceil$ bits for an index of the component carrier of the second type downlink control information; 6 bits for the aggregation level of the control channel element and the start position of the control channel element of the physical downlink control channel bearing the second type downlink control information, and n is the number of downlink component carriers allocated to the terminal; or said third type downlink control information includes: 2*n bits for the indication information of the downlink control information format included in the second type downlink control information of downlink scheduling, $\lceil \log_2 n \rceil$ bits for the index of the component carrier of the second type downlink control information of the downlink scheduling; 6 bits for the aggregation level of the control channel element and the start position of the control channel element of the physical downlink control channel bearing the second type downlink control information of the downlink scheduling, 2*m bits for the indication information of the downlink control information format included in the second type downlink control information of uplink scheduling, $\lceil \log_2 n \rceil$ bits for the index of the component carrier of the second type downlink control information of the uplink scheduling; 6 bits for the aggregation level of the control channel element and the start position of the control channel element of the physical downlink control channel bearing the second type downlink control information of the uplink scheduling, and n is the number of downlink component carriers allocated to the terminal; and m is the number of uplink component carriers allocated to the terminal.

The uplink scheduling information and/or the downlink scheduling information of one or more component carriers borne in said second type downlink control information is:

a combination of the downlink control information of the uplink scheduling information and/or the downlink control information of the downlink scheduling information of k1 component carriers allocated to the terminal, and k1 is determined according to the indication information of the downlink control information format included in the second downlink control information borne in said third type downlink control information, $1 \leq k1 \leq n$; or a combination of k2 pieces of the downlink control information of the downlink scheduling information and/or l pieces of the downlink control information of the uplink scheduling information, wherein k2 and l are determined according to the indication information of the downlink control information format included in the second downlink control information borne in said third type downlink control information, $1 \leq k2 \leq n$ and $1 \leq l \leq m$, n is the number of downlink component carriers allocated to the terminal; and m is the number of uplink component carriers allocated to the terminal. The present invention further provides a base station, which is configured to:

set downlink control information in a physical downlink control channel, set first type downlink control information on an anchor component carrier, and set third type downlink control information on a prime component carrier; and send said physical downlink control channel through the component carriers; wherein said first type downlink control information bears one or more types of uplink scheduling information, downlink scheduling information and uplink power control information of the component carrier of said first type downlink control information, said third type downlink control information bears indication information of second type downlink control information, and said second type downlink control information bears the uplink scheduling information and/or the downlink scheduling information of one or more component carriers.

The present invention further provides a method for detecting downlink control information, wherein a terminal blindly detects first type downlink control information on a anchor component carrier, and blindly detects third type downlink control information on a prime component carrier; wherein said first type downlink control information bears one or more types of uplink scheduling information, downlink scheduling information and uplink power control information of the component carrier of said first type downlink control information, said third type downlink control information bears indication information of second type downlink control information, and said second type downlink control information bears the uplink scheduling information and/or the downlink scheduling information of one or more component carriers.

The indication information of the second type downlink control information borne in said third type downlink control information includes one or more types of following information: indication information of downlink control information format included in the second type downlink control information, indication information of the component carrier of the second type downlink control information, indication information of an aggregation level of a control channel element and a start position of a control channel element of the physical downlink control channel bearing the second type downlink control information, and uplink scheduling indication information or downlink scheduling indication information.

When the terminal detects the third type downlink control information on the prime component carrier, the terminal obtains codewords of the second type downlink control information from a control channel element set on a specified component carrier to decode the second type downlink control information according to the indication information of the second type downlink control information borne in the third type downlink control information.

Said anchor component carrier and prime component carriers are semi-statically configured by higher layer signaling, and said anchor component carrier and prime component carriers are UE-specific anchor component carrier and prime component carriers.

A downlink control information format of the first type downlink control information blindly detected by the terminal on the anchor component carrier and a downlink control information format of the third type downlink control information blindly detected by the terminal on the prime component carrier are determined by a related configuration of higher layer signaling.

Said terminal further blindly detects the downlink control information format for common control information scheduling on the prime component carriers.

The present invention further provides a terminal, which comprises a detection module, wherein:

said detection module is configured to: blindly detect first type downlink control information on a anchor component carrier, and blindly detect third type downlink control information on a prime component carrier; wherein said first type downlink control information bears one or more types of uplink scheduling information, downlink scheduling information and uplink power control information of the component carrier of said first type downlink control information, said third type downlink control information bears indication information of second type downlink control information, and said second type downlink control information bears the uplink scheduling information and/or the downlink scheduling information of one or more component carriers.

The method for sending downlink control information provided in the present invention has better scheduling flexibility, compatibility and bit error performance, and lower number of the blind detection times and the blind detection times is not increased with the increase of the number of the scheduling component carriers and it has less signaling overhead, and it can better solve the problem of sending the downlink control information of the carrier aggregation, facilitate the compatibility of the LTE-Advanced with the LTE Release-8, and facilitate the implementation of the LTE-Advanced.

BRIEF DESCRIPTION OF DRAWINGS

FIG. 2 (b) is another schematic diagram of the third type DCI according to the present invention.

PREFERRED EMBODIMENTS OF THE PRESENT INVENTION

Figure 1:
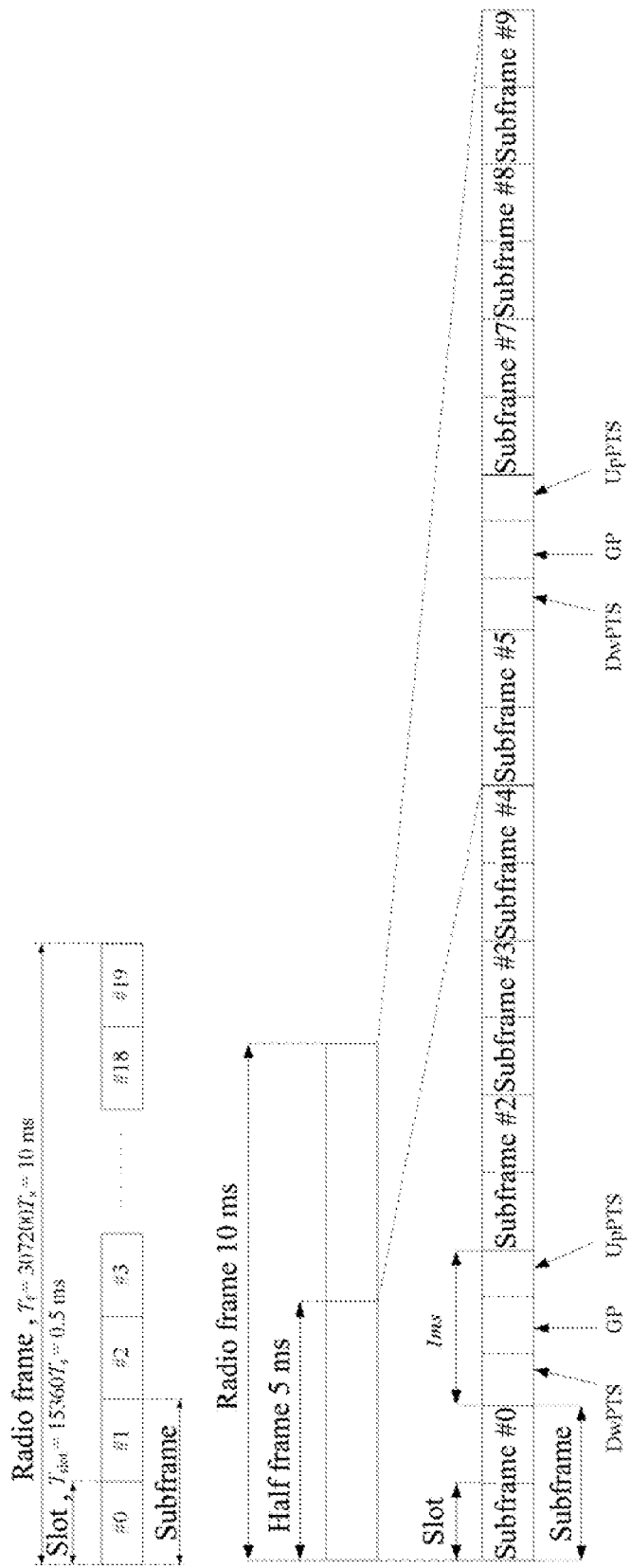
FIG. 1 is a schematic diagram of the frame structure of the FDD/TDD modes in the LTE system.

Below it will describe the embodiment of the present invention with reference to the examples in detail, thereby to sufficiently understand how to apply the technical means to solve the technical problem in the present invention and the implementation process achieving the technical effects and to implement the present invention hereby.

The present invention relates to following 3 types of DCI, wherein 1) the first type DCI bears the related uplink scheduling information, downlink scheduling information or uplink power control information related to its single component carrier.

2) the second type DCI bears the uplink scheduling information and/or downlink scheduling information of the single component carrier or a plurality of component carriers.

3) the third type DCI bears the indication information of the second type DCI.

The indication information of the second type DCI borne in the third type DCI includes one or more types of information: the indication information of the DCI format included in the second type DCI, the indication information of component carriers of the second type DCI, the indication information of the CCE aggregation level and the CCE start position of the PDCCH bearing the second type DCI, and uplink scheduling information/downlink scheduling indication information and so on. The indication information of the DCI format included in the second type DCI is the DCI format information corresponding to the DCI of the uplink scheduling and/or downlink scheduling of each component carrier allocated to the terminal.

The information borne in the second type DCI is the combination of the uplink and/or downlink scheduling information DCI of the k (1≤k≤n) component carriers allocated to the terminal, and k is determined by the indication information of the DCI format included in the second type DCI in said third type DCI.

When the terminal is configured to receive data with n (1<n≤5) component carriers, one downlink component carrier is configured as the anchor component carrier, and its related uplink scheduling information, downlink scheduling information or uplink power control information are borne by the first type DCI on this component carrier, and the other one or two component carriers are set as the prime component carriers, which are for transmitting the third type DCI. The second type DCI can be transmitted with any component carriers.

The present invention provides a method for sending downlink control information, the base station carries the downlink control information in the physical downlink control channel, and sends said physical downlink control channel through component carriers, wherein the base station bears the first type downlink control information on the anchor component carrier, and bears the third type downlink control information on the prime component carrier.

The above anchor component carrier and the prime component carrier are semi-statically configured by the higher layer signaling, which is the UE-specific.

Accordingly, the present invention provides a base station, which is configured to:

set downlink control information in the physical downlink control channel, and set the first type downlink control information on the anchor component carrier, and set the third type downlink control information on the prime component carrier; and send the physical downlink control channel through the component carriers; wherein the first type downlink control information bears one or more of uplink scheduling information, downlink scheduling information and uplink power control information of the component carriers of the first type downlink control information, the third type downlink control information bears the indication information of the second type downlink control information, and the second type downlink control information bears uplink scheduling information and/or downlink scheduling information of one or more component carriers.

The present invention further provides a method for detecting downlink control information, wherein the terminal blindly detects the first type downlink control information on the anchor component carrier, and blindly detects the third type downlink control information on the prime component carrier, namely the terminal blindly detects the DCI format determined by the related configurations of the higher layer signaling on the anchor component carrier; blindly detects the DCI format corresponding to the third type DCI in the UE-specific Search space of the prime component carrier, wherein the DCI format corresponding to the third type DCI is determined by the related configurations of the higher layer signaling, and the terminal can determine the DCI format corresponding to the third type DCI by an agreed way according to information of the number of the component carriers allocated to this terminal in the higher layer signaling and the index of each component carrier and so on.

If the terminal detects the third type DCI on the prime component carrier, then the terminal obtains the codewords of the second type DCI from the CCE set on the specific component carrier according to the borne indication information of the second type DCI, and decodes according to the indication information of the DCI format included in the second type DCI carried in the third DCI.

Accordingly, the present invention further provides a terminal, which comprises a detection module:

this detection module is configured to: blindly detect the first type downlink control information on the anchor component carrier, and blindly detect the third type downlink control information on the prime component carrier, wherein the first type downlink control information bears one or more types of uplink scheduling information, downlink scheduling information and uplink power control information of the component carriers of the first type downlink control information, the third type downlink control information bears the indication information of the second type downlink control information, and the second type downlink control information bears the uplink scheduling information and/or the downlink scheduling information of one or more component carriers.

EXAMPLE 1

The DCI format blindly detected by the terminal on the anchor component carrier is determined by the related configurations of the higher layer signaling (the RNTI and the transmission mode). The DCI format to be detected on the anchor component carrier includes the DCI format for common control information scheduling (namely the DCI format for bearing the uplink power control information, system message, paging, RACH Response and so on) and DCI format corresponding to the UE-specific third type DCI.

Method 1

Figure 2A:
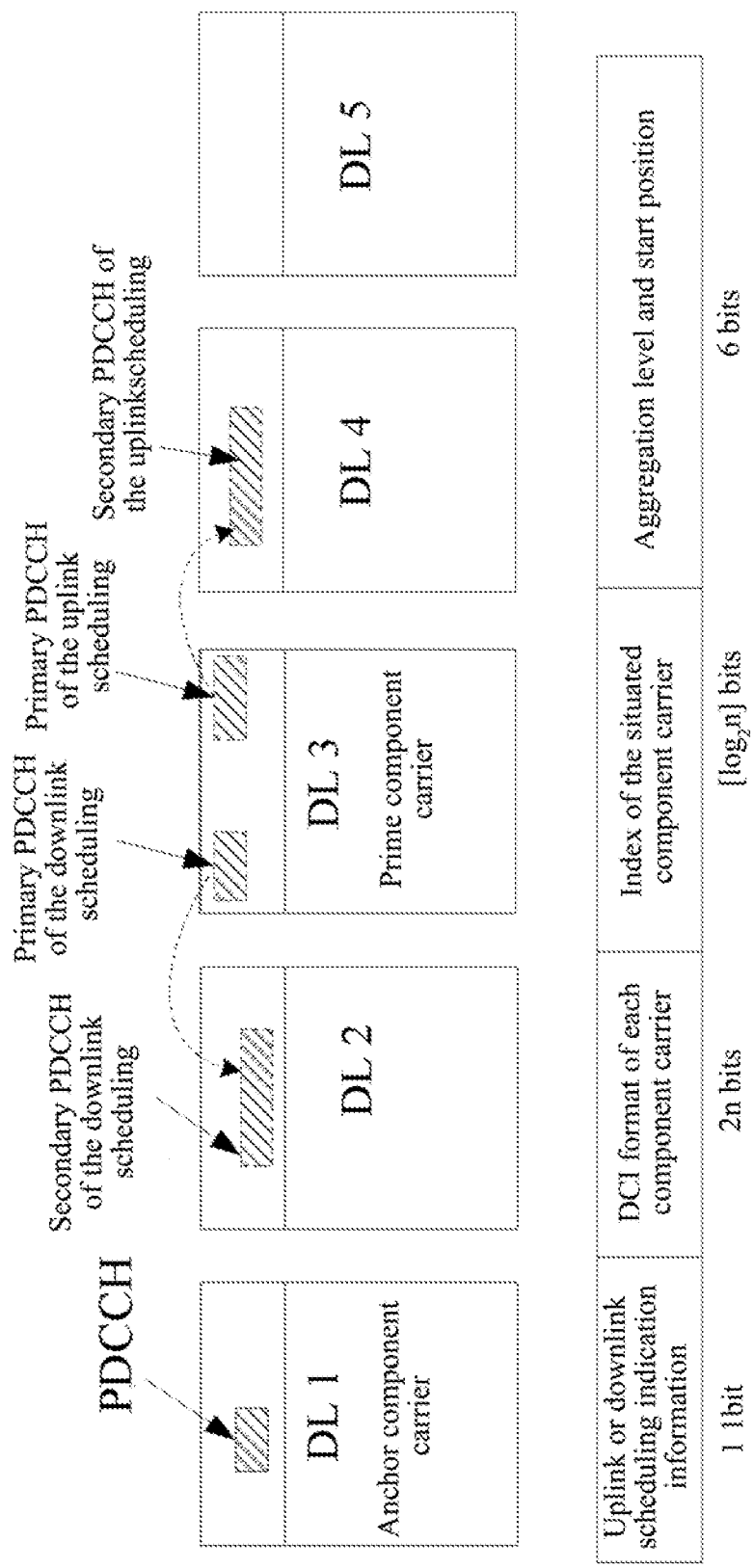
FIG. 2 (a) is a schematic diagram of the third type DCI according to the present invention.
Figure 2B:
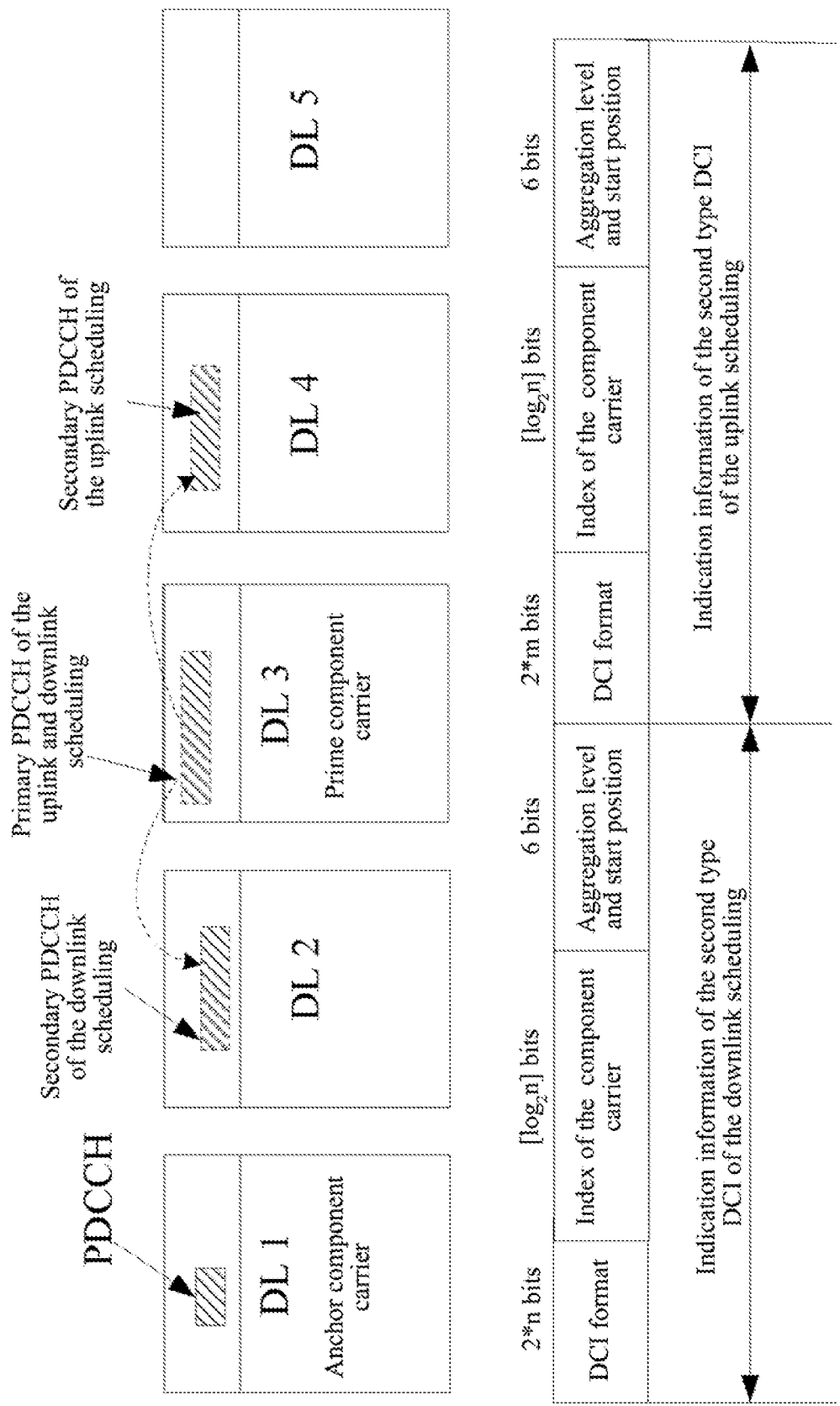

As shown in FIG. 2 (a), the uplink scheduling and downlink scheduling use one piece of the third type DCI to indicate respectively.

The information borne in the third type DCI is: uplink scheduling information or downlink scheduling indication information, 1 bit, for indicating the uplink or downlink scheduling;

2*n bits (2 bits per component carrier, wherein 00 denotes that the corresponding component carrier does not have the DCI format, and each of 01, 10 and 11 denotes one type of DCI formats) for indicating the DCI format of each component carrier; n is the number of the downlink component carriers allocated to the terminal;

$\lceil \log_2 n \rceil$ bits for indicating the index of the component carrier of the second type DCI of this terminal;

6 bits for indicating the CCE aggregation level and the CCE start position of the PDCCH of the second type DCI of this terminal. 6 bits denote 64 factors, which are divided into four disjoint subsets, which respectively correspond to the CCE aggregation levels, i.e. 1, 2, 4, and 8. Each factor in the subset corresponds to one relative offset with reference to the CCE start position of the Search space determined by the UE ID, and the unit of this offset is the corresponding CCE aggregation level.

The information in the second type DCI is the combination of the uplink scheduling information and/or the downlink scheduling information DCI of the allocated k1 ($1 \le k1 \le n$) component carriers. k1 is determined by the indication information of the DCI format included in the second type DCI borne in the third type DCI, wherein the resource block group size of the resource allocation in the uplink scheduling information and the downlink scheduling information is twice of the resource block group size defined in the LTE Rel-8 with the same bandwidth.

The terminal blindly detects the DCI format determined by the related configurations (the RNTI and the transmission mode) of the higher layer signaling on the anchor component carrier; blindly detects the DCI format for common control information scheduling on the prime component carrier (namely the DCI format for bearing the uplink power control information, system message, paging, RACH Response and so on) and DCI format corresponding to the UE-specific third type DCI. If the third type DCI is detected by the terminal on the prime component carrier, then the terminal obtains the codewords of the second type DCI from the CCE set on the specific component carrier according to the borne indication information of the second type DCI and decodes according to the indication information of the DCI format included in the second type DCI carried in the third DCI.

Method 2

As shown in FIG. 2 (b), both the uplink scheduling and the downlink scheduling use one piece of the third type DCI to indicate.

The information borne in the third type DCI includes two parts: DCI indication information related to the downlink scheduling information and the DCI indication information related to uplink scheduling information, and below it will provide one example, but the present invention is not limited to this, and particularly is:

2*n bits (2 bits per component carrier, wherein 00 denotes that the corresponding component carrier does not have the DCI format, and each of 01, 10 and 11 denotes one type of DCI formats) for indicating the DCI format of the downlink scheduling of each component carrier; n is the number of the downlink component carriers allocated to the terminal;

$\lceil \log_2 n \rceil$ bits for indicating the index of the component carrier of the second type DCI of the downlink scheduling;

6 bits for indicating the CCE aggregation level and the CCE start position of the PDCCH of the second type DCI of the downlink scheduling.

2*m bits (m is the number of the uplink component carriers allocated to the terminal, 2 bits per component carrier, wherein 00 denotes that the corresponding component carrier does not have the DCI format, and each of 01, 10 and 11 denotes one type of DCI formats) for indicating the DCI format of the uplink scheduling of each component carrier;

$\lceil \log_2 n \rceil$ bits for indicating the index of the component carrier of the second type DCI of the uplink scheduling;

6 bits for indicating the CCE aggregation level and the CCE start position of the PDCCH of the second type DCI of uplink scheduling. 6 bits denote 64 factors, which are divided into 4 disjoint subsets, which respectively correspond to the CCE aggregation levels, i.e. 1, 2, 4, and 8. Each factor in the subset corresponds to one relative offset with reference to the CCE start position of the Search space determined by the UE ID, and the unit of this offset is the corresponding CCE aggregation level.

The information in the second type DCI is the combination of the k2 ($1 \le k2 \le n$) pieces of uplink scheduling information and/or l ($1 \le l \le m$) pieces of downlink scheduling information DCI. k2 and l are determined by the indication information of the DCI format included in the second type DCI in the third type DCI, wherein the resource block group size of the resource allocation in the uplink and downlink scheduling information is twice of the resource block group size defined in the LTE Rel-8 with the same bandwidth.

The terminal blindly detects the DCI format determined by the related configurations (the RNTI and the transmission mode) of the higher layer signaling on the anchor component carrier; blindly detects the DCI format for common control information scheduling on the prime component carrier (namely the DCI format for bearing the uplink power control information, system message, paging, RACH Response and so on) and DCI format corresponding to the UE-specific third type DCI. If the third type DCI is detected by the terminal on the prime component carrier, then the terminal obtains the codewords of the second type DCI from the CCE set on the specific component carrier according to the indication information of the second type DCI borne, and decodes according to the indication information of the DCI format included in the second type DCI carried in the third DCI.

Application Example 1

The terminal receives and sends data on n ($1 < n \le 5$) component carriers, and the higher layer signaling sets one downlink component carrier as the anchor component carrier, and sets another downlink component carrier as the prime component carrier.

The DCI format blindly detected by the terminal on the anchor component carrier is determined by the related configurations (the RNTI and the transmission mode) of the higher layer signaling. The DCI format blindly detected on the prime component carrier includes the DCI format for common control information scheduling (namely the DCI format for bearing the uplink power control, system message, paging, RACH Response and so on) and DCI format corresponding to the UE-specific third type DCI.

If the terminal detects the third type DCI on the prime component carrier, then the terminal obtains the codewords of the second type DCI from the CCE set on the specific component carrier according to the borne indication information of the second type DCI, and decodes according to the indication information of the DCI format included in the second type DCI carried in the third DCI.

Application Example 2

The terminal receives and sends data on n (1<n≤5) component carriers, and the higher layer signaling sets one downlink component carrier as the anchor component carrier, and sets another two downlink component carriers as the prime component carrier.

The DCI format blindly detected by the terminal on the anchor component carrier is determined by the related configurations (the RNTI and the transmission mode) of the higher layer signaling. The DCI format respectively blindly detected on the two prime component carriers includes the DCI format for common control information scheduling (namely the DCI format for bearing the uplink power control, system message, paging, RACH Response and so on) and DCI format corresponding to the UE-specific third type DCI.

If the terminal detects the third type DCI on the prime component carrier, then the terminal obtains the codewords of the second type DCI from the CCE set on the specific component carrier according to the borne indication information of the second type DCI and carries out the decoding according to the indication information of the DCI format included in the second type DCI carried by the third DCI.

Industrial Applicability

The method for sending downlink control information provided in the present invention has better scheduling flexibility, compatibility and bit error performance, and lower number of times of the blind detections and the blind detection times is not increased with the increase of the number of the scheduling component carriers and it has less signaling overhead, and it can better solve the problem of sending the downlink control information of the carrier aggregation, facilitate the compatibility of the LTE-Advanced with the LTE Release-8, and facilitate the implementation of the LTE-Advanced.

What is claimed is:

1. A method for sending downlink control information comprising:
    a base station carrying the downlink control information in a physical downlink control channel, and sending said physical downlink control channel through downlink component carriers, wherein said downlink component carriers comprise an anchor component carrier and a prime component carrier, said anchor component carrier and prime component carrier are semi-statically configured by higher layer signaling, and said anchor component carrier and prime component carrier are UE-specific anchor component carrier and prime component carrier;
    said base station bearing first type downlink control information on said anchor component carrier, and bearing third type downlink control information on said prime component carrier, wherein
    said first type downlink control information bears one or more types of uplink scheduling information, downlink scheduling information and uplink power control information of said anchor component carrier on which said first type downlink control information is borne, said third type downlink control information bears indication information of second type downlink control information, and said second type downlink control information bears the uplink scheduling information and/or the downlink scheduling information of one or more component carriers.

2. The method as claimed in claim 1, wherein
a number of said component carriers is n, and when said base station transmits data to a terminal on n component carriers, one component carrier is the anchor component carrier, and one or two component carriers are prime component carriers, 1<n≤5.

3. The method as claimed in claim 1, wherein
the indication information of the second type downlink control information borne in said third type downlink control information includes one or more types of following information:
the indication information of downlink control information format included in the second type downlink control information, the indication information of the component carrier of the second type downlink control information, the indication information of an aggregation level of a control channel element and a start position of a control channel element of the physical downlink control channel bearing the second type downlink control information, and uplink scheduling indication information or downlink scheduling indication information.

4. The method as claimed in claim 3, wherein
said third type downlink control information includes: 1 bit for uplink scheduling indication information or downlink scheduling indication information, 2*n bits for the indication information of the downlink control information format included in the second type downlink control information, ⌈log₂ n⌉ bits for an index of the component carrier of the second type downlink control information; 6 bits for the aggregation level of the control channel element and start position of the control channel element of the physical downlink control channel bearing the second type downlink control information, and n is the number of downlink component carriers allocated to the terminal; or
said third type downlink control information includes: 2*n bits for the indication information of the downlink control information format included in the second type downlink control information of downlink scheduling, ⌈log₂ n⌉ bits for the index of the component carrier of the second type downlink control information of the downlink scheduling; 6 bits for the aggregation level of the control channel element and the start position of the control channel element of the physical downlink control channel bearing the second type downlink control information of the downlink scheduling, 2*m bits for the indication information of the downlink control information format included in the second type downlink control information of uplink scheduling, ⌈log₂ n⌉ bits for the index of the component carrier of the second type downlink control information of the uplink scheduling; 6 bits for the aggregation level of the control channel element and the start position of the control channel element of the physical downlink control channel bearing the second type downlink control information of the uplink scheduling, and n is the number of downlink component carriers allocated to the terminal; and m is the number of uplink component carriers allocated to the terminal.

5. The method as claimed in claim 1, wherein
the uplink scheduling information and/or the downlink scheduling information of one or more component carriers borne in said second type downlink control information is:

a combination of the downlink control information of the uplink scheduling information and/or the downlink control information of the downlink scheduling information of k1 component carriers allocated to the terminal, and k1 is determined according to the indication information of the downlink control information format included in the second downlink control information borne in said third type downlink control information, $1 \leq k1 \leq n$ ; or a combination of allocated k2 pieces of the downlink control information of the downlink scheduling information and/or allocated l pieces of the downlink control information of the uplink scheduling information, wherein k2 and l are determined according to the indication information of the downlink control information format included in the second downlink control information borne in said third type downlink control information, $1 \leq k2 \leq n$ and $1 \leq l \leq m$, n is the number of downlink component carriers allocated to the terminal; and m is the number of uplink component carriers allocated to the terminal.

6. A method for detecting downlink control information comprising:
   a base station carrying the downlink control information in a physical downlink control channel, and sending said physical downlink control channel through downlink component carriers, wherein said downlink component carriers comprise an anchor component carrier and a prime component carrier, said anchor component carrier and prime component carrier are semi-statically configured by higher layer signaling, and said anchor component carrier and prime component carrier are UE-specific anchor component carrier and prime component carrier;
   a terminal blindly detecting first type downlink control information on said anchor component carrier, and blindly detecting third type downlink control information on said prime component carrier; wherein
   said first type downlink control information bears one or more types of uplink scheduling information, downlink scheduling information and uplink power control information of said anchor component carrier on which said first type downlink control information is borne, said third type downlink control information bears indication information of second type downlink control information, and said second type downlink control information bears the uplink scheduling information and/or the downlink scheduling information of one or more component carriers.

7. The method as claimed in claim 6, wherein the indication information of the second type downlink control information borne in said third type downlink control information includes one or more types of following information: the indication information of downlink control information format included in the second type downlink control information, the indication information of the component carrier of the second type downlink control information, the indication information of an aggregation level of a control channel element and a start position of a control channel element of the physical downlink control channel bearing the second type downlink control information, and uplink scheduling indication information or downlink scheduling indication information.

8. The method as claimed in claim 6, further comprising:
   when the terminal detects the third type downlink control information on the prime component carrier, the terminal obtains codewords of the second type downlink control information from a control channel element set on a specified component carrier to decode the second type downlink control information according to the indication information of the second type downlink control information borne in the third type downlink control information.

9. The method as claimed in claim 6, wherein the downlink control information format of the first type downlink control information blindly detected by the terminal on the anchor component carrier and the downlink control information format of the third type downlink control information blindly detected by the terminal on the prime component carrier are determined by a related configuration of higher layer signaling.

10. The method as claimed in claim 6, further comprising:
    said terminal further blindly detecting the downlink control information format for common control information scheduling on the prime component carrier.

11. A terminal, comprising a detection module, wherein:
    a base station carries downlink control information in a physical downlink control channel, and sends said physical downlink control channel through downlink component carriers, wherein said downlink component carriers comprise an anchor component carrier and a prime component carrier, said anchor component carrier and prime component carrier are semi-statically configured by higher layer signaling, and said anchor component carrier and prime component carrier are UE-specific anchor component carrier and prime component carrier;
    said detection module is configured to: blindly detect first type downlink control information on said anchor component carrier, and blindly detect third type downlink control information on said prime component carrier;
    wherein said first type downlink control information bears one or more types of uplink scheduling information, downlink scheduling information and uplink power control information of said anchor component carrier on which said first type downlink control information is borne, said third type downlink control information bears indication information of second type downlink control information, and said second type downlink control information bears the uplink scheduling information and/or the downlink scheduling information of one or more component carriers.

12. The method as claimed in claim 3, wherein
    the uplink scheduling information and/or the downlink scheduling information of one or more component carriers borne in said second type downlink control information is:
    a combination of the downlink control information of the uplink scheduling information and/or the downlink control information of the downlink scheduling information of k1 component carriers allocated to the terminal, and k1 is determined according to the indication information of the downlink control information format included in the second downlink control information borne in said third type downlink control information, $1 \leq k1 \leq n$ ; or
    a combination of allocated k2 pieces of the downlink control information of the downlink scheduling information and/or allocated l pieces of the downlink control information of the uplink scheduling information, wherein k2 and l are determined according to the indication information of the downlink control information format included in the second downlink control information borne in said third type downlink control information, $1 \leq k2 \leq n$ and $1 \leq l \leq m$ , n is the number of downlink component carriers allocated to the terminal; and m is the number of uplink component carriers allocated to the terminal.

13. The method as claimed in claim 7, further comprising:
when the terminal detects the third type downlink control information on the prime component carrier, the terminal obtains codewords of the second type downlink control information from a control channel element set on a specified component carrier to decode the second type downlink control information according to the indication information of the second type downlink control information borne in the third type downlink control information.

* * * * *